United States Patent
Wang et al.

(10) Patent No.: US 7,684,523 B2
(45) Date of Patent: Mar. 23, 2010

(54) METHOD AND APPARATUS FOR CHANNEL ESTIMATION

(75) Inventors: Shu Wang, San Diego, CA (US); Sang G. Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 11/536,485

(22) Filed: Sep. 28, 2006

(65) Prior Publication Data

US 2007/0070945 A1    Mar. 29, 2007

Related U.S. Application Data

(60) Provisional application No. 60/722,018, filed on Sep. 28, 2005.

(51) Int. Cl.
 *H04L 27/06* (2006.01)
(52) U.S. Cl. ..................................... 375/342
(58) Field of Classification Search ................ 375/316, 375/342, 354, 357, 369, 372, 373, 374; 370/395.62, 370/507, 329, 491; 455/265; 702/89; 713/375, 713/400
 See application file for complete search history.

(56) References Cited

U.S. PATENT DOCUMENTS

| | | | |
|---|---|---|---|
| 6,442,218 B1 * | 8/2002 | Nakamura et al. | 375/340 |
| 7,426,175 B2 | 9/2008 | Zhuang et al. | |
| 2004/0037258 A1 | 2/2004 | Scherzer et al. | |
| 2004/0218576 A1 | 11/2004 | Imagawa et al. | |
| 2005/0025224 A1 | 2/2005 | Mesecher et al. | |
| 2005/0195791 A1 | 9/2005 | Sung et al. | |
| 2009/0037597 A1 | 2/2009 | McElwain | |

FOREIGN PATENT DOCUMENTS

| | | |
|---|---|---|
| CA | 2277752 | 9/2000 |
| EP | 0096247 A1 | 4/2000 |
| EP | 0996247 | 4/2000 |
| EP | 1073241 | 1/2001 |
| WO | 96/02989 | 2/1996 |

(Continued)

OTHER PUBLICATIONS

Nagate, A. et al. "A Study on Channel Estimation Methods for MC-CDMA Systems" In: IEEE Vehicular Technology Conference, 57th Semiannual Conference, VTC 2003-Spring, New Yourk: IEEE, Apr. 22, 2003, vol. 3, pp. 2101-2105.

(Continued)

*Primary Examiner*—Sam K Ahn
(74) *Attorney, Agent, or Firm*—Lee, Hong, Degerman, Kang & Waimey

(57) ABSTRACT

A method of determining at least one channel for channel response in a wireless communication system is disclosed. More specifically, the method comprises receiving a plurality of signals from a transmitting end, wherein the signals comprise a plurality of pilot symbols and a plurality of data symbols, determining weight value of each pilot symbol, assigning the determined each weight value to each pilot symbol, and demodulating each data symbol by using respective information of the weight value corresponding to each pilot symbol.

15 Claims, 16 Drawing Sheets

FOREIGN PATENT DOCUMENTS

| WO | 98/44644 | 10/1998 |
|----|----------|---------|
| WO | WO 99/08460 | 2/1999 |
| WO | 2001/003347 | 1/2001 |

OTHER PUBLICATIONS

Thomas, A.T. et al.: "Multi-User Frequency-Domain Channel Identification, Interference Suppression, and Equalization for Time-Varying Broadband Wireless Communications", Mar. 16, 2000; Proceedings of the 2000 IEEE Sensor Array and Multichannel Signal Processing Workshop, New York.

Wang, S. et al.: "Semi-Blind Adaptive Multiuser Detection for Asynchronous CDMA"; May 22, 2005; IEEE International Conference on Electro Information Technology, New York.

Wang, S. et al.: "Semi-Blind Decorrelating Multiuser Detection for Synchronous CDMA"; Mar. 13, 2003; IEEE Wireless Communications and Networking, WCNC 2003, New York.

Zhou, H. et al.: Subspace-based blind adaptive multiuser detection using Kalman filter; Jun. 3, 2005; IEE Proceedings-Communications.

* cited by examiner

CDMA SPREADING AND DESPREADING

CDMA SPREADING AND DESPREADING USING MULTIPLE SPREADING SEQUENCES

CDMA 2000 INITIALIZATION STATE

CDMA 2000 SYSTEM ACCESS STATE

CDMA2000 ACCESS ATTEMPT

CDMA ACCESS SUB-ATTEMPT $N = MAX\_RSP\_SEQ_S$ for Response messages, or
$MAX\_RSP\_SEQ_S$ for Request messages $PD = 0$ for Response messages

CDMA SYSTEM ACCESS STATE USING SLOT OFFSET

FIG. 10
COMPARISON OF CDMA2000 FOR 1x AND 1xEV-DO
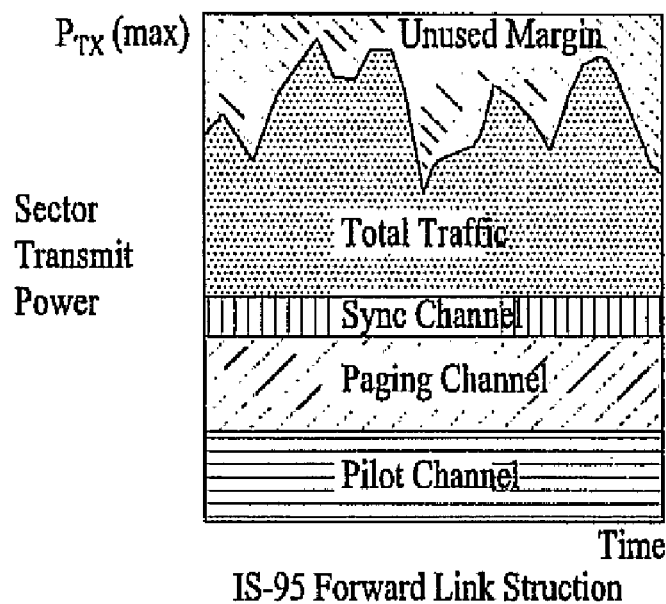
IS-95 Forward Link Struction
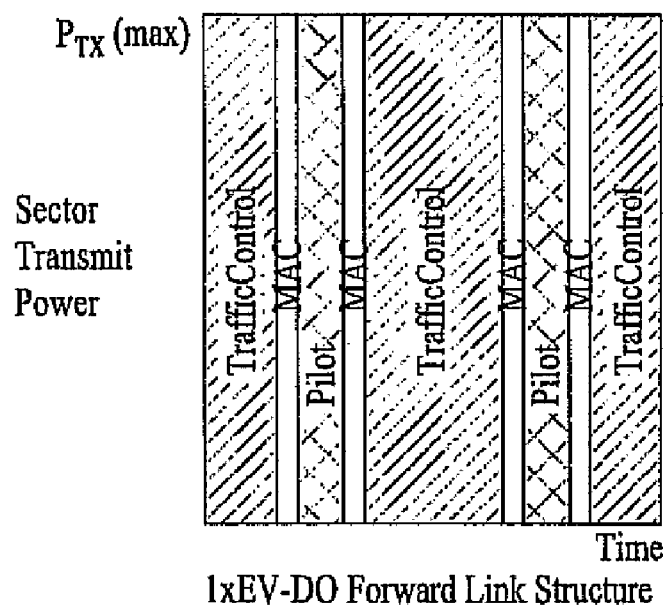
1xEV-DO Forward Link Structure 1xEV-DO NETWORK ARCHITECTURE

1xEV-DO DEFAULT PROTOCOL

1xEV-DO NON-DEFAULT PROTOCOL

1xEV-DO SESSION ESTABLISHMENT

1xEV-DO CONNECTION LAYER PROTOCOLS

METHOD AND APPARATUS FOR CHANNEL ESTIMATION

This application claims the benefit of U.S. Provisional Application No. 60/722,018, filed on Sep. 28, 2005, which is hereby incorporated by reference.

BACKGROUND OF THE INVENTION

1. Field of the Invention

The present invention relates to a method for estimating channel, and more particularly, to a method and an apparatus for channel estimation.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

In a wireless cellular communication system, it is important to device schemes and techniques that increase the information rate and improve the robustness of a communication system under the harsh conditions of the wireless environment. The wireless communication channel is the source of various impairments to a digital communication system, due to factors such as the relative mobility of transmitter and receiver, multipath propagation, interference from other users of the frequency spectrum, and time-variation which is more commonly known as fading.

For straightforward communication system design, an ideal channel is one that exhibits constant frequency response over the frequency band, and thus produces undistorted replica of the transmitted signal at the receiver, possibly delayed and scaled. To put differently, if the transmitted signal s(t) has an equivalent low pass frequency representation S(f), occupying total bandwidth W, then the equivalent low pas frequency response C(f) of an ideal channel is $C(f)=|C(f)|\cdot e^{j\angle C(f)} = C\cdot e^{j2\pi t f}$ for all frequencies in the band W of interest. If s(t) is processed through the above ideal channel, the received signal would be $r(t)=C\cdot s(t-\tau)$.

Unfortunately, the real world transmission (e.g., mobile wireless channel) has imperfections which impair reliable transmission of information. Consequently, the task of the receiver becomes more complicated when those impairments are unknown beforehand and/or time variant.

SUMMARY OF THE INVENTION

Accordingly, the present invention is directed to a method and an apparatus for channel estimation that substantially obviates one or more problems due to limitations and disadvantages of the related art.

An object of the present invention is to provide a method of detecting at least one channel for channel estimation in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of detecting at least one channel for channel estimation in a wireless communication system includes receiving a plurality of signals from a transmitting end, wherein the signals comprise a plurality of pilot symbols and a plurality of data symbols, determining weight value of each pilot symbol, assigning the determined each weight value to each pilot symbol, and demodulating each data symbol by using respective information of the weight value corresponding to each pilot symbol.

In another aspect of the present invention, a method of detecting at least one channel in a wireless communication system includes receiving a plurality of signals from a transmitting end, wherein the signals comprise a plurality of pilot symbols and a plurality of data symbols, determining weight value of each pilot symbol, assigning the determined weight value to each pilot symbol, combining weighted multiple pilot symbols into a single weighted pilot symbol, and demodulating each data symbol by using information of the single weight pilot symbol.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 10 illustrates a comparison of cdma2000 for 1x and 1xEV-DO;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
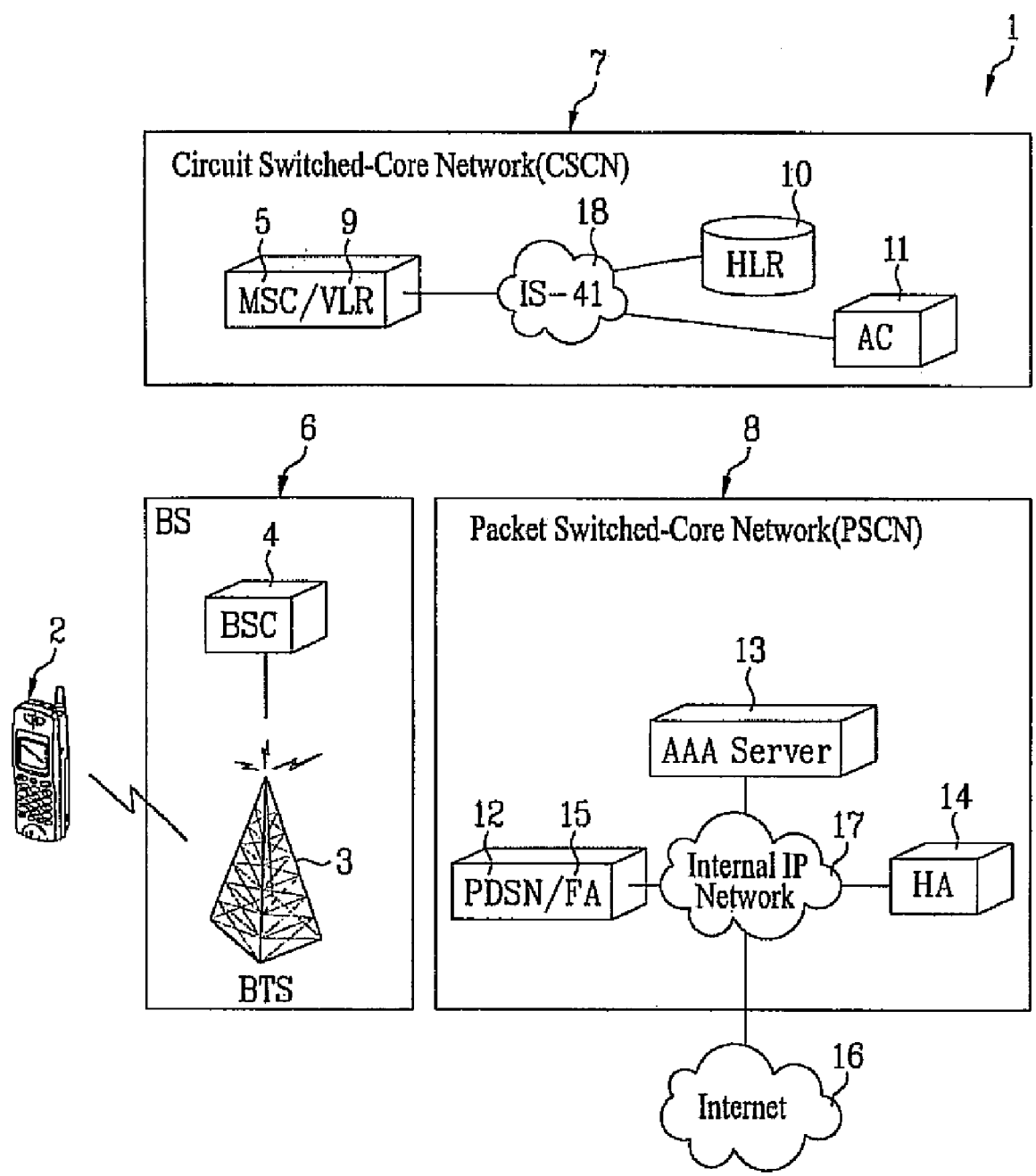
FIG. 1 illustrates wireless communication network architecture.

Referring to FIG. 1, a wireless communication network architecture1 is illustrated. A subscriber uses a mobile station (MS) 2 to access network services. The MS 2 may be a portable communications unit such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Care Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic.

The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Figure 2A:
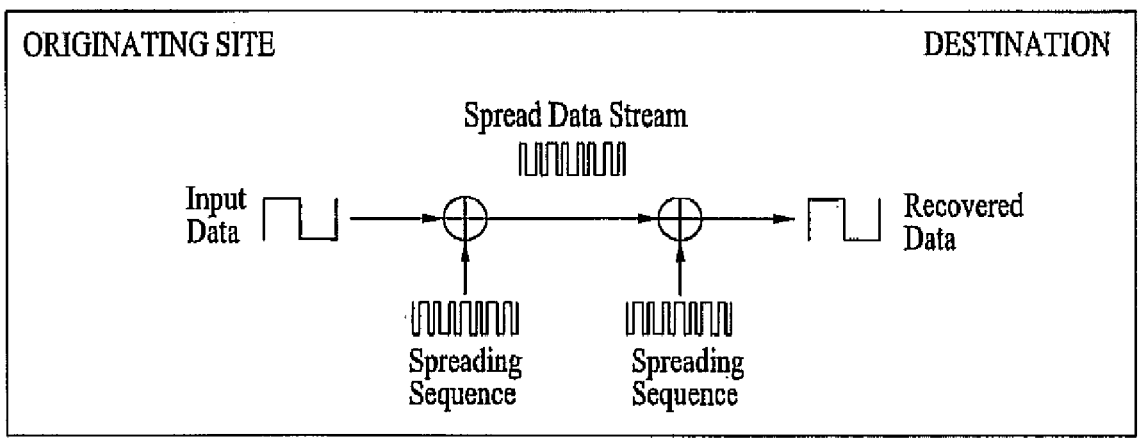
FIG. 2A illustrates a CDMA spreading and de-spreading process.
Figure 2B:
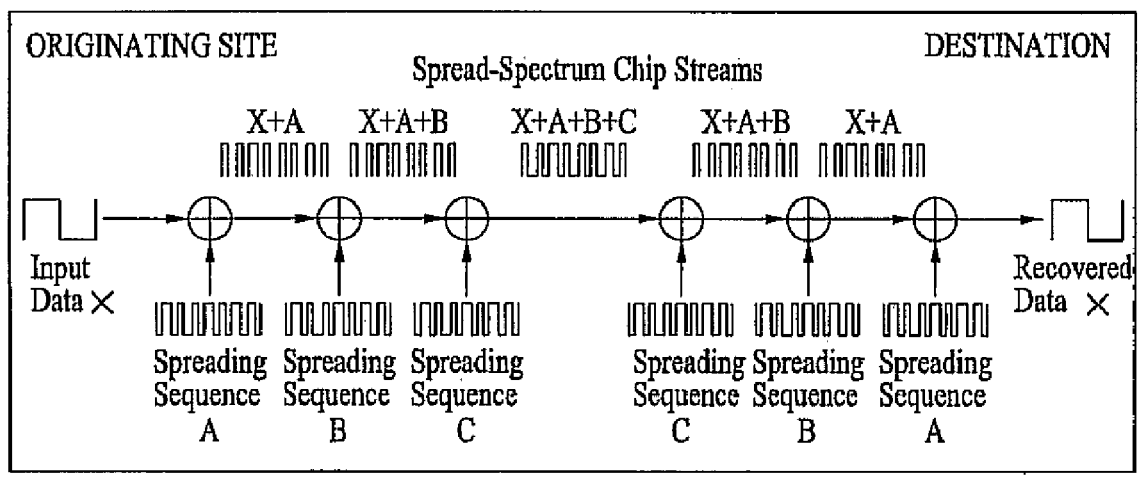
FIG. 2B illustrates a CDMA spreading and de-spreading process using multiple spreading sequences.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Figure 3:
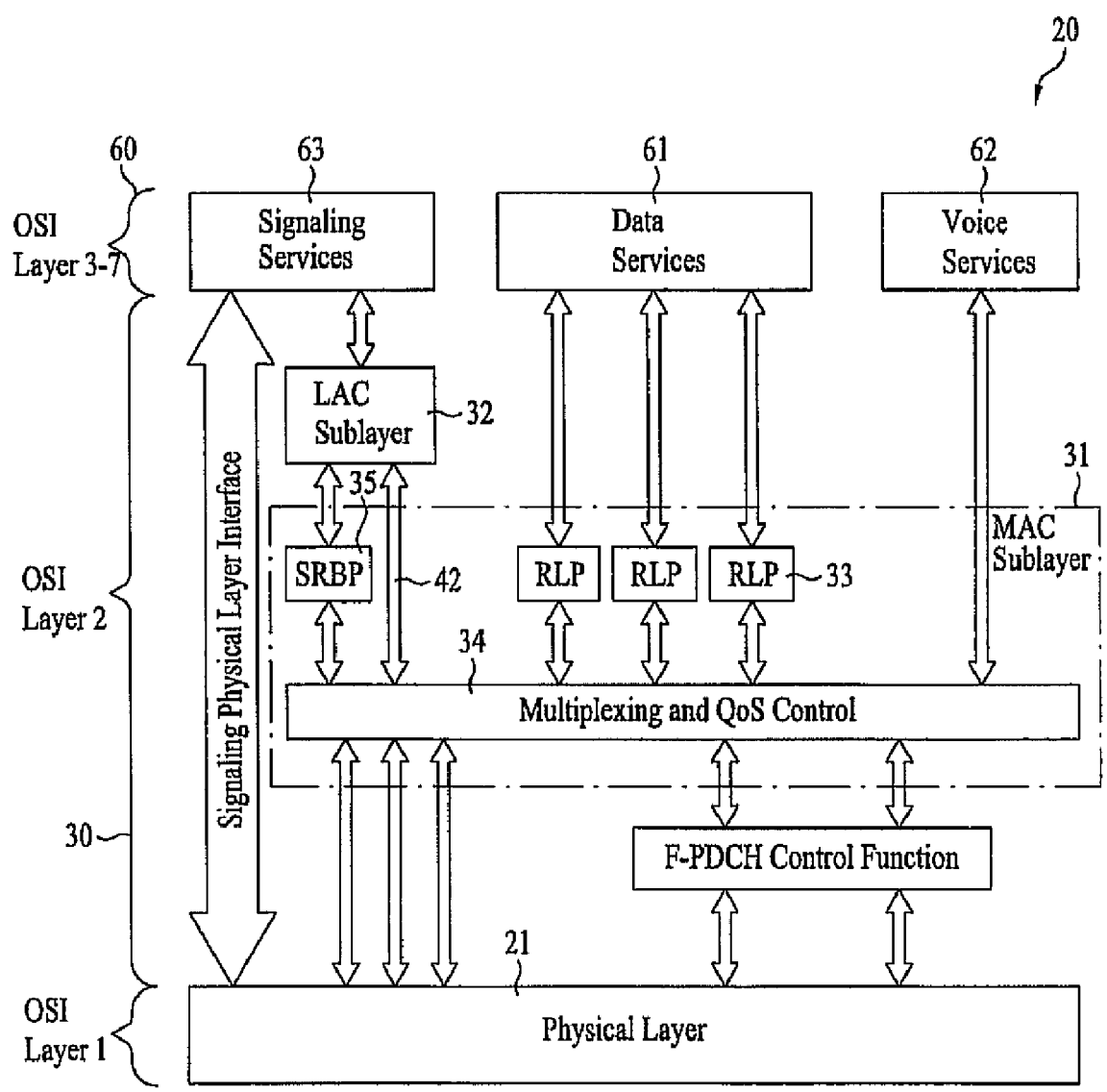
FIG. 3 illustrates a data link protocol architecture layer for a cdma2000 wireless network.

FIG. 3 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Figure 4:
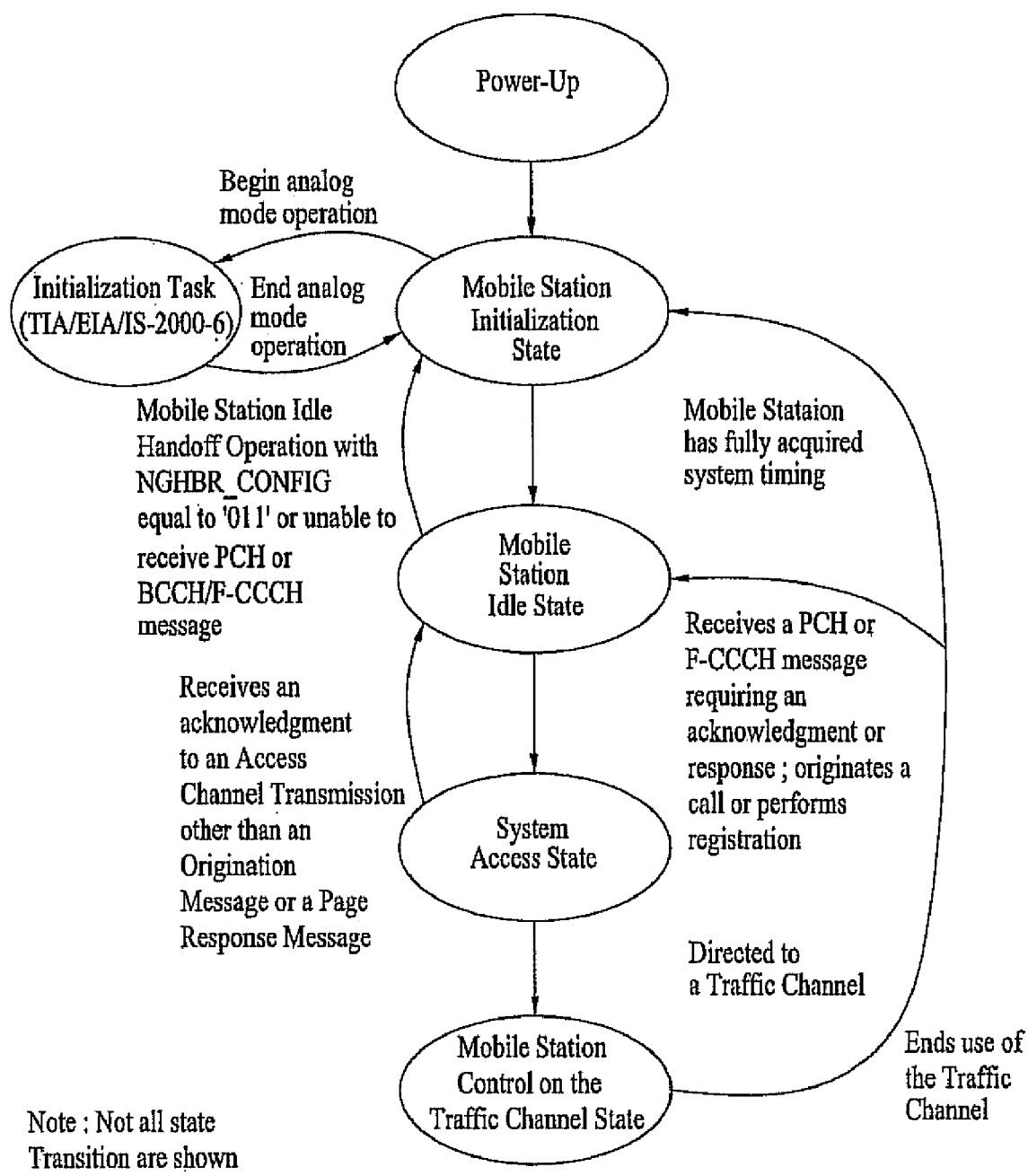
FIG. 4 illustrates cdma2000 call processing.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

Figure 5:
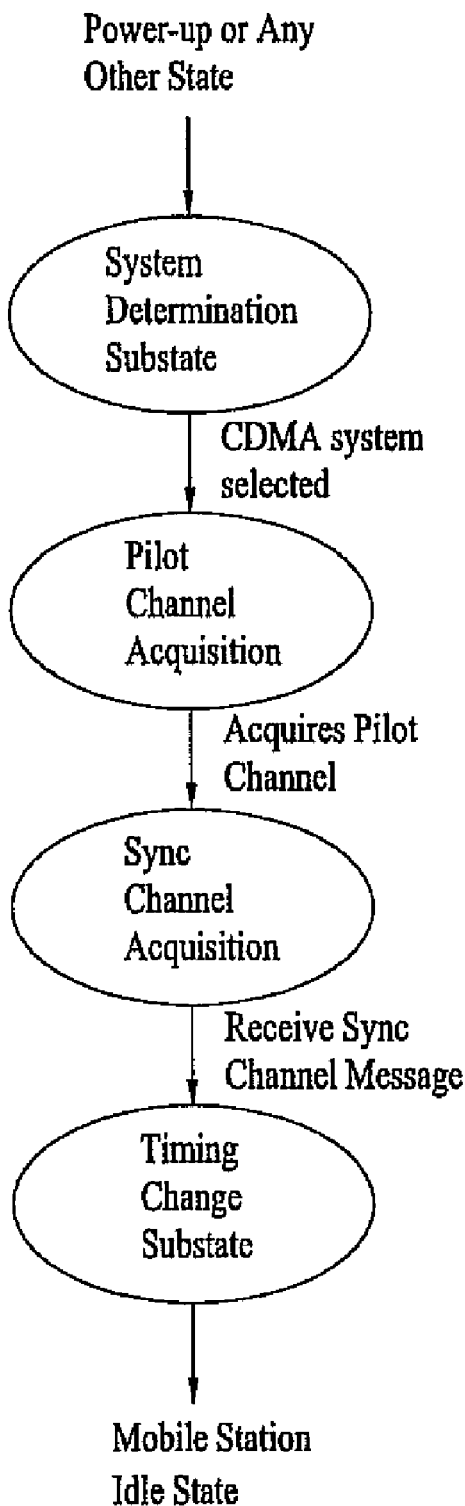
FIG. 5 illustrates the cdma2000 initialization state.

FIG. 5 illustrates the initialization state of a MS 2. The Initialization state includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System Determination. A service provider using a redirection process may also control System determination. After the MS 2 selects a system, it must determine on which channel within that system to search for service. Generally the MS 2 uses a prioritized channel list to select the channel.

Pilot Channel Processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel, During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the General Page message or the Universal Page message may be used to page the mobile on F-CCCH. A Quick paging channel that allows the MS 2 to power up for a shorter period of time than is possible using only slotted paging on F-PCH or F-CCCH is also supported.

Figure 6:
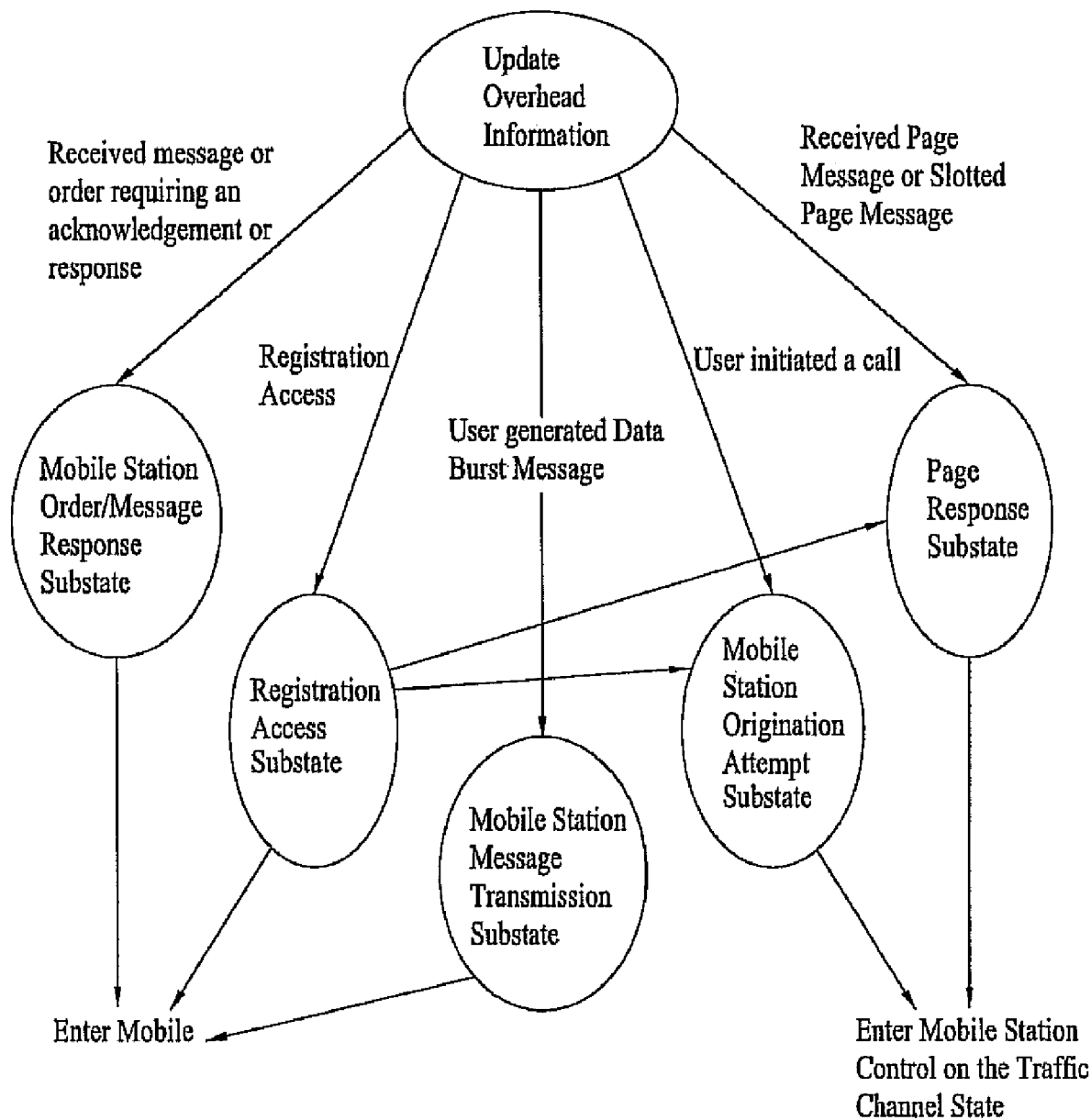
FIG. 6 illustrates the cdma2000 system access state.

FIG. 6 illustrates the System Access state. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

Figure 7:
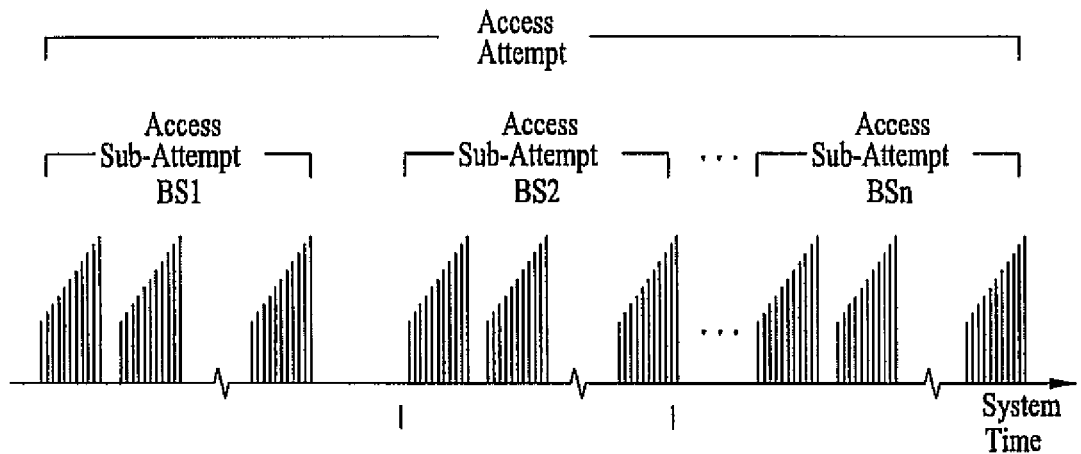
FIG. 7 illustrates a conventional cdma2000 access attempt.
Figure 8:
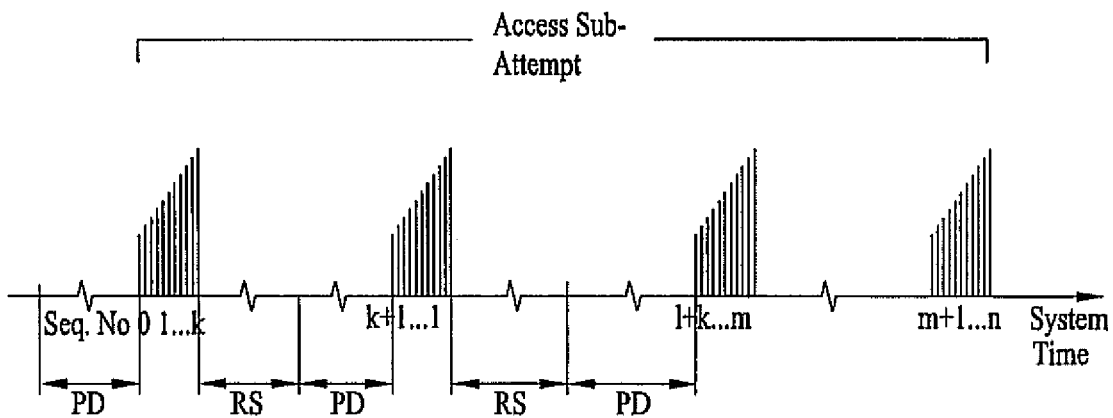
FIG. 8 illustrates a conventional cdma2000 access sub-attempt.
Figure 9:
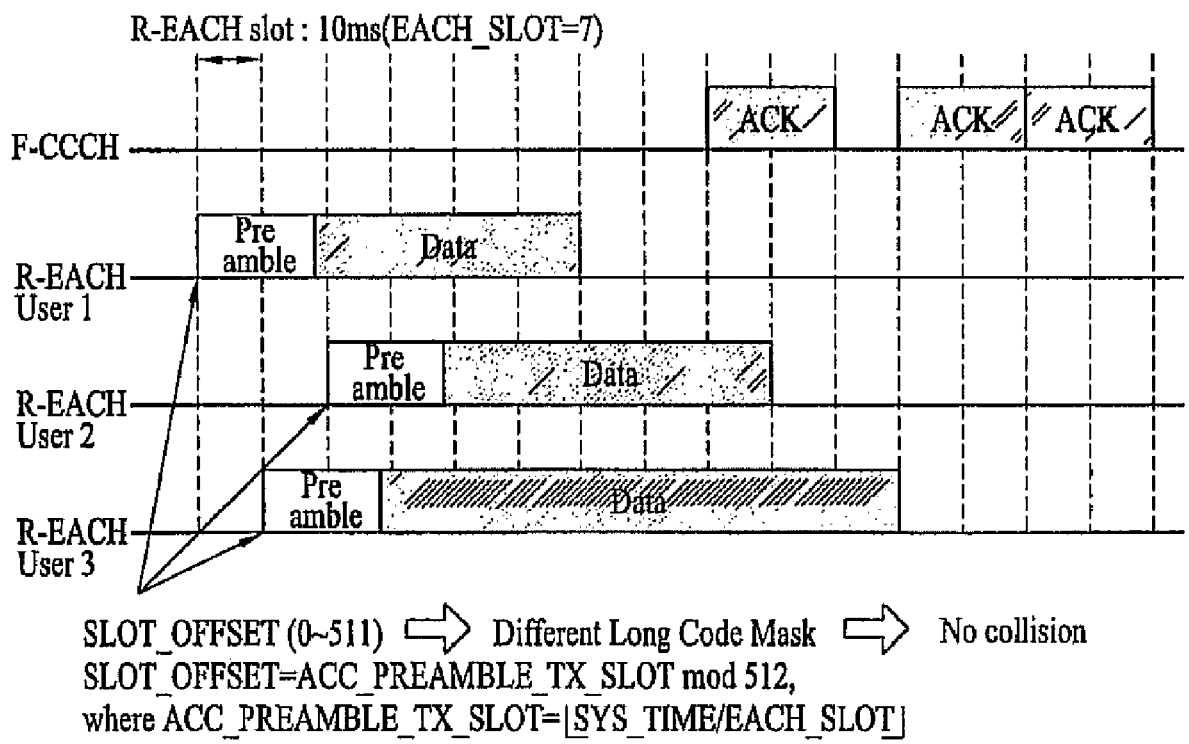
FIG. 9 illustrates the conventional cdma2000 system access state using slot offset.

An access attempt, which refers to the entire process of sending one Layer 2 encapsulated PDU and receiving an acknowledgment for the PDU, consists of one or more access sub-attempts, as illustrated in FIG. 7. An access sub-attempt includes of a collection of access probe sequences, as illustrated in FIG. 8. Sequences within an access sub-attempt are separated by a random backoff interval (RS) and a persistence delay (PD). PD only applies to access channel request, not response. FIG. 9 illustrates a System Access state in which collisions are avoided by using a slot offset of 0-511 slots.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for data only or data Optimized ("DO"). Furthermore, there is a peak data rate of 2.4 Mbps or 3.072 Mbps on the forward Link and 153.6 Kbps or 1.8432 Mbps on the reverse Link. Moreover, a 1xEV-DO system provides separated frequency bands and internetworking with a 1x System. FIG. 10 illustrates a comparison of cdma2000 for a 1x system and a 1xEV-DO system.

In CDMA2000, there are concurrent services, whereby voice and data are transmitted together at a maximum data rate of 614.4 kbps and 307.2 kbps in practice. An MS 2 communicates with the MSC 5 for voice calls and with the PDSN 12 for data calls. A cdma2000 system is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. A 1xEV-DO system is characterized by fixed power and a variable rate with a single forward channel that is time division multiplexed.

Figure 11:
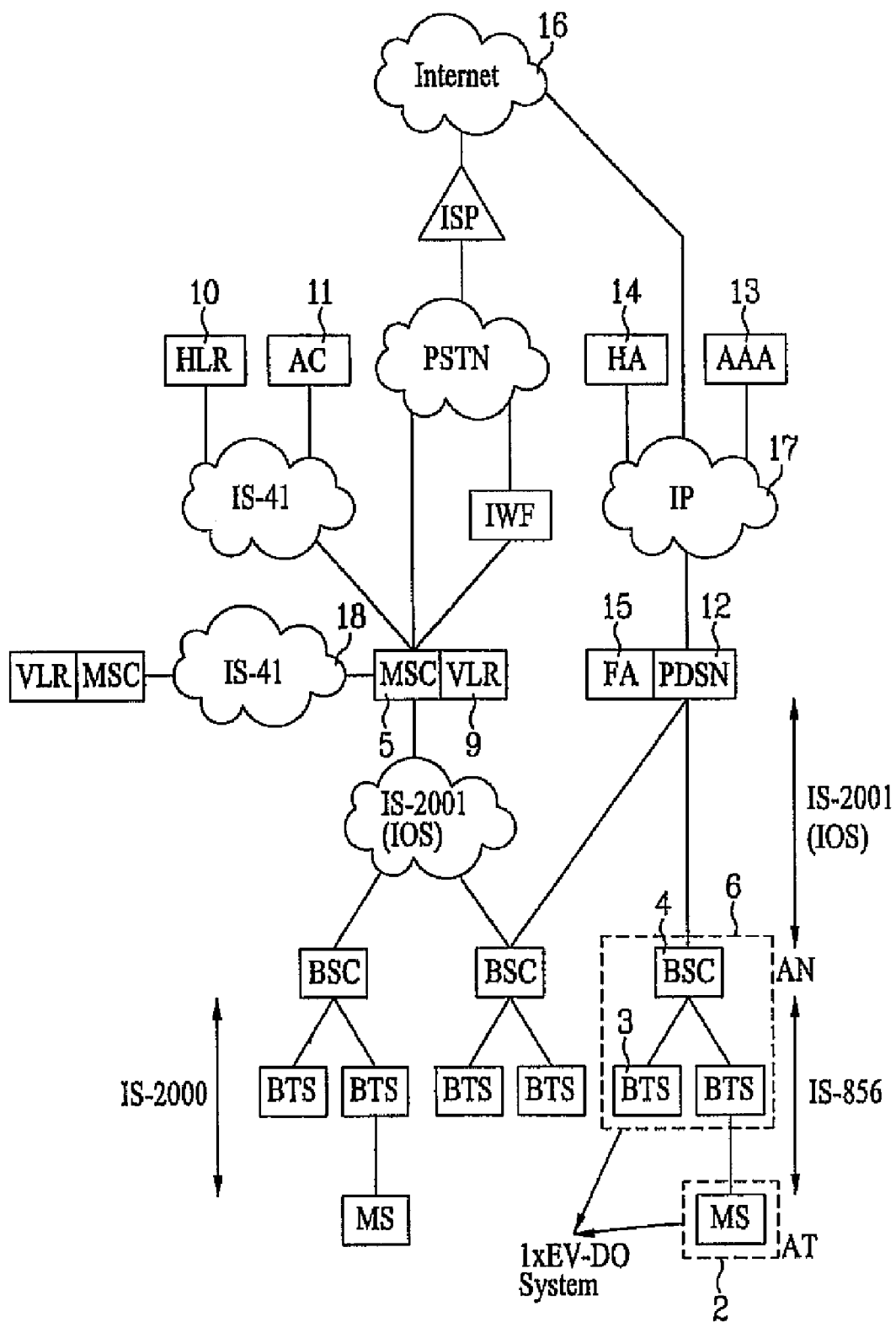
FIG. 11 illustrates a network architecture layer for a 1xEV-DO wireless network.

FIG. 11 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization.

Figure 12:
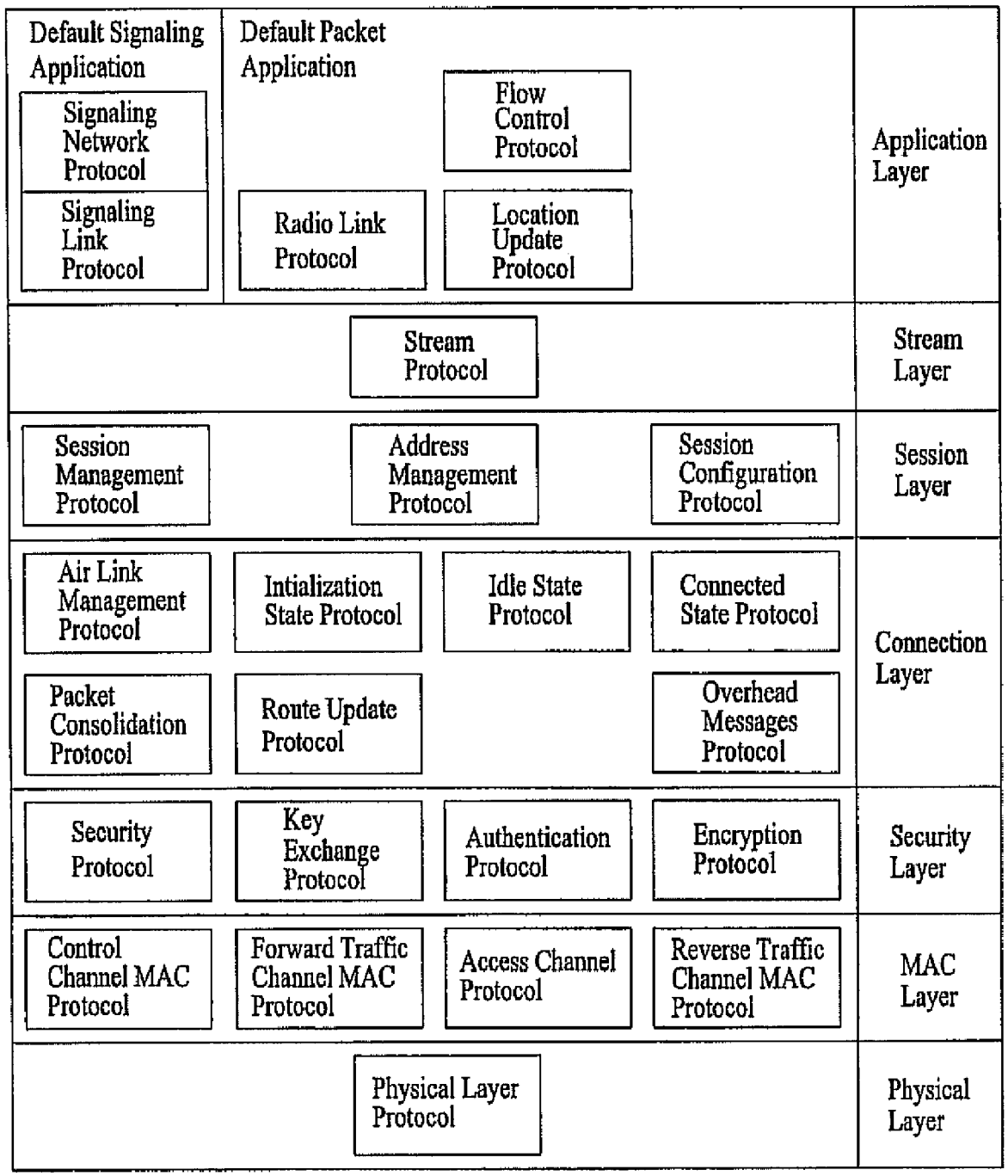
FIG. 12 illustrates 1xEV-DO default protocol architecture.
Figure 13:
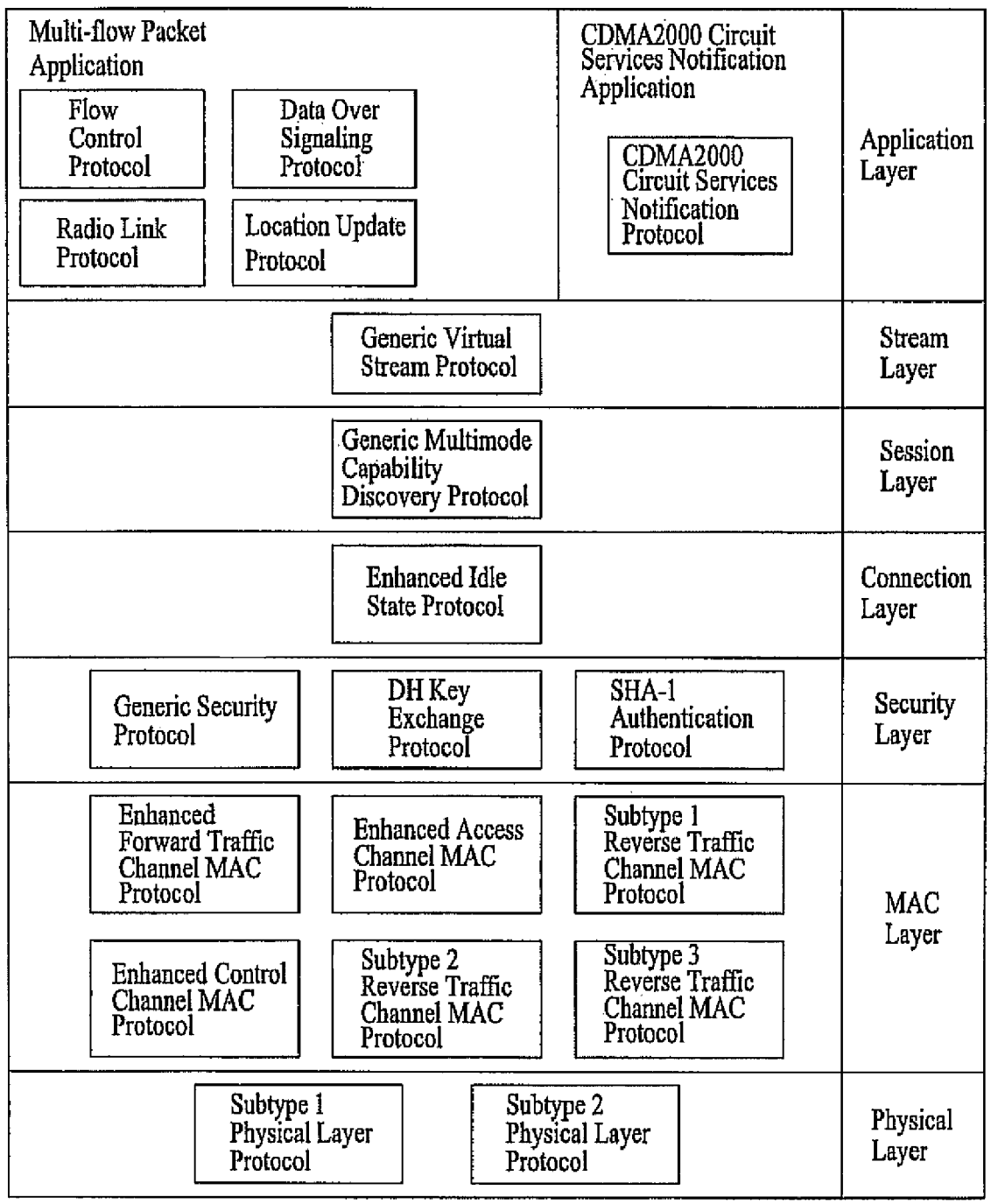
FIG. 13 illustrates 1xEV-DO non-default protocol architecture.

FIG. 12 illustrates a 1xEV-DO default protocol architecture. FIG. 13 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The stream layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

Figure 14:
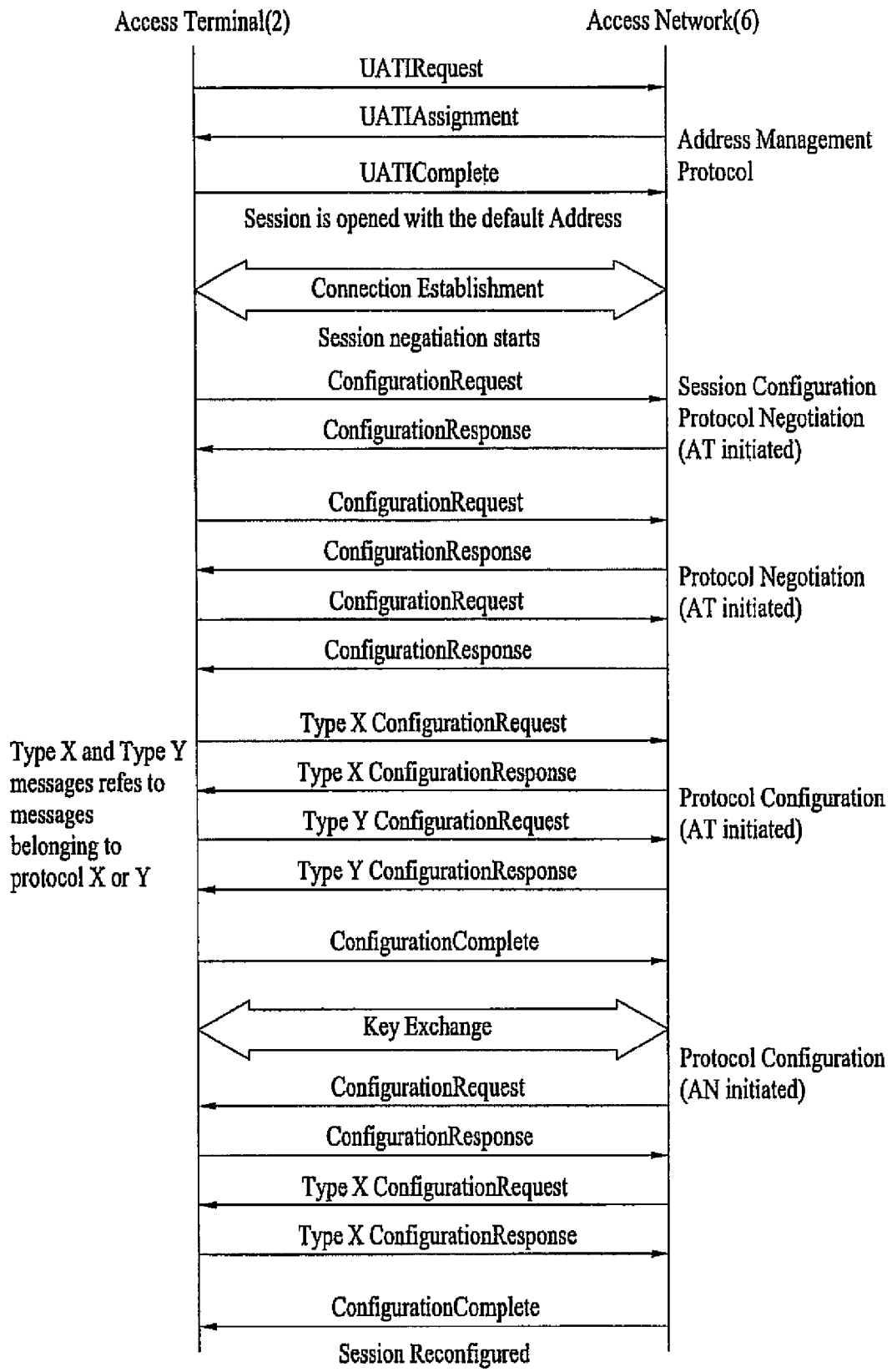
FIG. 14 illustrates 1xEV-DO session establishment.

FIG. 14 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange key refers a Key Exchange protocol in the Security Layer setting up keys for authentication.

A "session' refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications. Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

Figure 15:
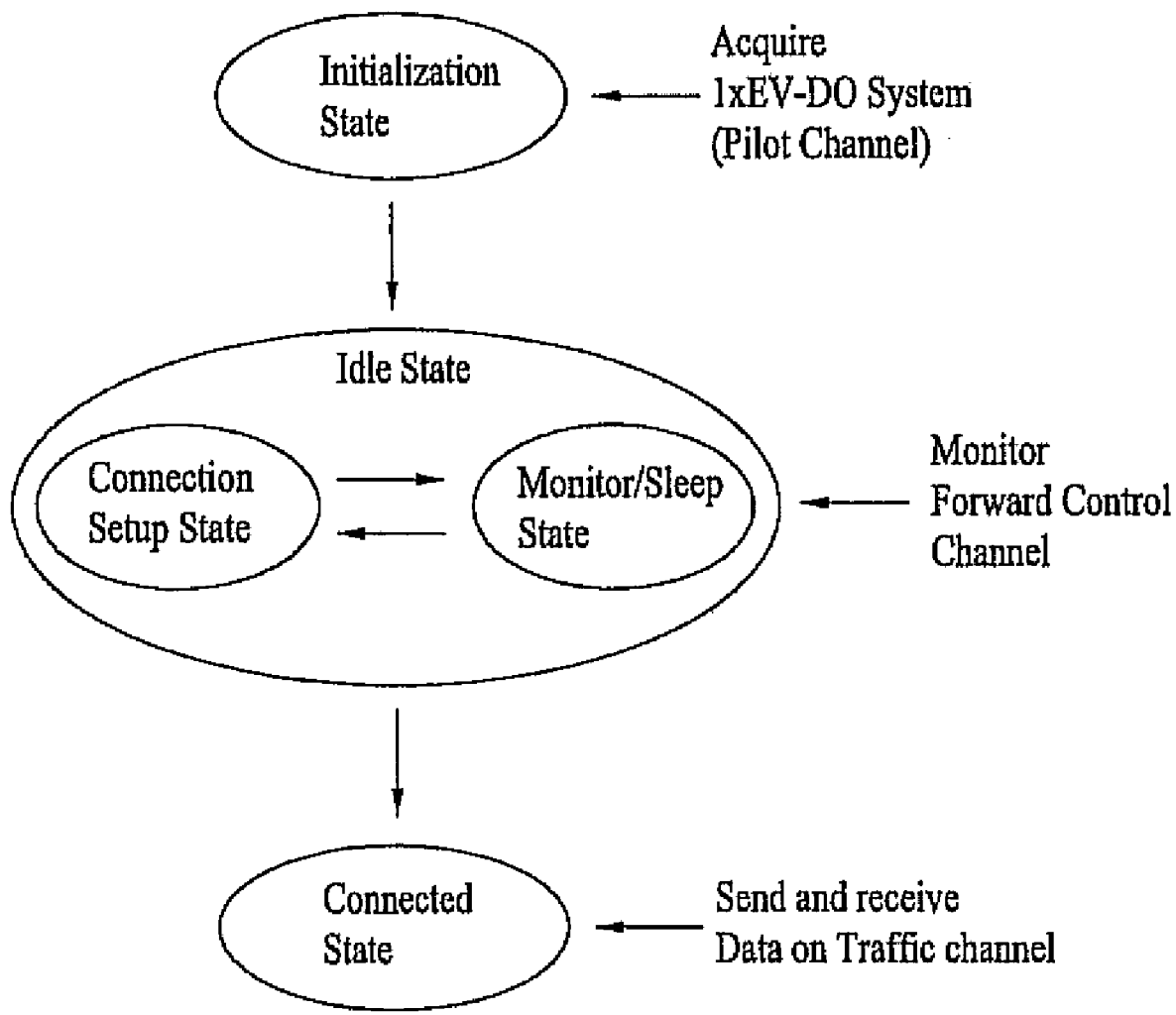
FIG. 15 illustrates 1xEV-DO connection layer protocols.

FIG. 15 illustrates Connection Layer Protocols. The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 1283, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

One reason for the potential of collision is the inefficiency of the current persistence test in conventional methods. Because an AT 2 may require a short connection setup time, a paged AT may transmit access probes at the same time as another paged AT when a persistence test is utilized.

Conventional methods that use a persistence test are not sufficient since each AT 2 that requires a short connection setup times and/or is part of a group call may have the same persistence value, typically set to 0. If AT's 2 are co-located, such as In a group call, the Access Probes arrive at the An 6 at the same time, thereby resulting in access collisions and increased connection setup time.

Therefore, there is a need for a more efficient approach for access probe transmission from co-located mobile terminals requiring short connection times. The present invention addresses this and other needs such as interference cancellation.

In the wireless communication system, multiple access interference (MAI) and near-far problem can degrade wireless systems performance. To combat these issues, a multi-user detection (MUD) scheme, such as interference cancellation (IC) based scheme, can be used to mitigate the detrimental effects of these problems. However, the MUD assumes that the receiver knows the channel information or use some pilot symbols to estimate the channel, which can cause spectrum efficiency degradation.

The spectrum efficiency degradation can be caused by frequency offset, for example. Frequency offset can cause inter-carrier interference which degrades the performance of both the channel estimation and symbol detection. Further, frequency offset is estimated using the periodic nature of training sequences which are designed to have period parts. There are two main categories for training based timing and frequency estimation, namely, autocorrelation and cross-correlation based algorithms.

In autocorrelation based algorithms, repeated training data is transmitted and frequency offset is estimated by finding the phase difference between the repeated parts. In cross-correlation algorithms, the received signal is correlated with the known training data which is usually a pseudo-noise (PN) sequence with good autocorrelation properties.

Although transmission of repeated training information addresses in part the frequency offset estimation problem, it creates security problems since the repetitive structure of the preamble may be used by undesired users for synchronizing the transmitted signal—both time and frequency synchronization. In order to estimate the frequency offset of time distorted signals without preambles, the channel response can be known, or alternatively, frequency offset and channel response can be estimated jointly.

To this end, it is important for a receiving end to estimate channel response using known pilot sequences for compensating time-variance channel distortion. More accurate channel estimation can be achieved by averaging several consecutive channel estimates (e.g., averaging two or three closest channel estimates) compared to approximating using the closest channel estimate only.

Averaging several consecutive channel estimates often require averaging after individual channel estimations using pre-defined weights. Here, however, by using pre-defined weights, averaging operation is performed without considering the power distribution of the received pilots.

As one of an averaging method which takes into consideration, inter alia, the power distribution of the received pilots, a channel estimation framework can incorporate diversity combining techniques (e.g., RAKE combiner) to improve accuracy and simplicity. In implementation of this method, the combining weights of the pilot symbols can be determined and calculated based on timing difference, power, channel condition, pilot symbol quality, etc. Thereafter, a plurality of the weighted pilot symbols or signals can be combined into one signal. Using the combined signal, the channel response can be estimated.

There are numerous diversity techniques available for determining each weight for each pilot sequence or symbol. The determination can be based on power and phase, for example. Some of the diversity techniques include selective combining, equal gain combining, maximum ratio combining, minimum mean squared error (MMSE) ratio combining, and minimum bit error ratio (BER) combining.

In pilot-assisted communication system, a receiver typically uses multiple consecutively received pilot sequences for better channel estimation. There are various schemes associated with this channel estimation. For example, the receiver can use an individual channel estimation scheme in which the receiver combines the multiple channel estimates, obtained through each channel estimation, with each pilot sequence. Another example includes the receiver using a joint channel estimation scheme in which all received pilot sequences are used as a bigger pilot sequence.

Figure 16:
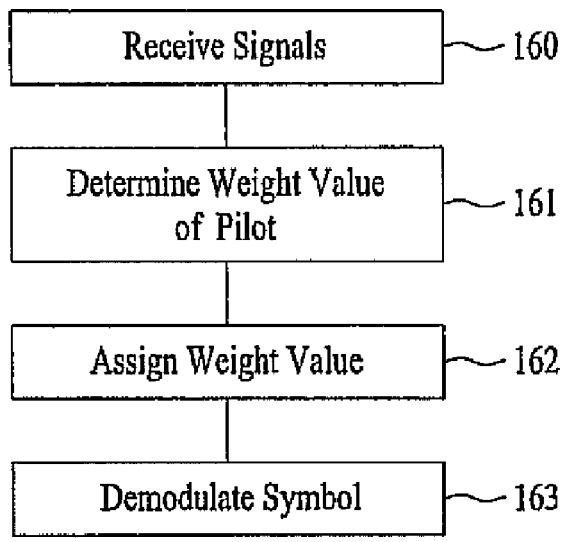
FIG. 16 illustrates a flow diagram of channel detection based on individual channel estimation.

FIG. 16 illustrates a flow diagram of channel detection based on individual channel estimation. In estimating the channel, a receiving end receives a plurality of signals which carry both pilot symbols and data symbols (S160). Using the received pilot symbols, the receiving end determines a weight value for each pilot symbol (S161). For determining the weight value, the receiving end takes into consideration various information, including pilot symbol power, quality of the pilot symbol, channel condition, interested data, and time difference. Thereafter, the receiving end can assign the weight value, determined in the previous step, to each pilot symbol (S162). By using each weighted pilot symbol, demodulation can be performed on each data symbol by using respective information of the weight value corresponding to each pilot symbol (S163).

Individual channel estimation can be performed by using the following algorithm formula.

$$h + \left(\sum_{i=1}^{3} w_i\right)^{-1} \sum_{i=1}^{3} w_i (x_i^H x_i)^{-1} x_i^H n_i \quad \text{[Formula 1]}$$

Here, h refers to a channel to be estimated, $w_i$ stands for weight, $x_i$ is the known pilot symbol, and $n_i$ is the vector of noise.

Furthermore, an error estimation ($\epsilon_h = \hat{h} - h$) with respect to individual channel estimation can be performed by using the following equation.

$$\varepsilon_2 = (x^H x)^{-1} x^H \left(\sum_{i=1}^{3} w_i\right) \sum_{i=1}^{3} w_i n_i \quad \text{[Equation 1]}$$

Figure 17:
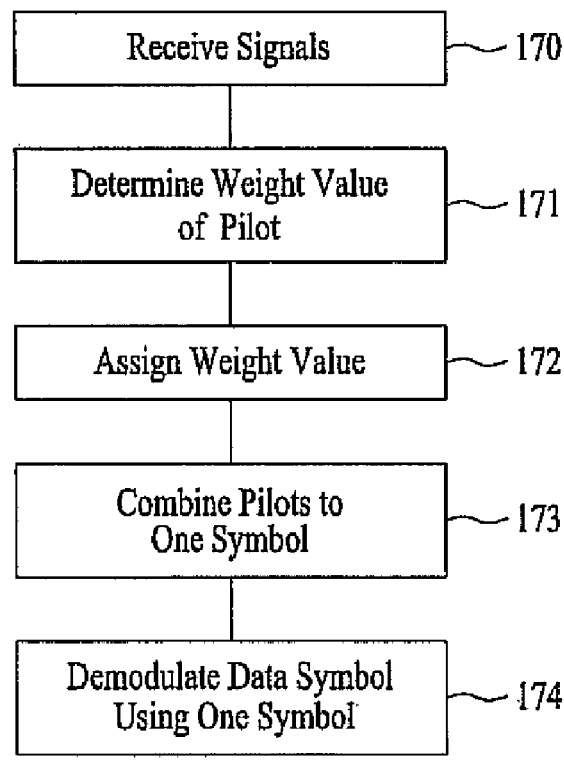
FIG. 17 illustrates a flow diagram of channel detection based on joint channel estimation.

FIG. 17 illustrates a flow diagram of channel detection based on joint channel estimation. In estimating the channel, a receiving end receives a plurality of signals which carry both pilot symbols and data symbols (S170). Using the received pilot symbols, the receiving end determines a weight value for each pilot symbol (S171). For determining the weight value, the receiving end takes into consideration various information, including pilot symbol power, quality of the pilot symbol, channel condition, interested data, and time difference. Thereafter, the receiving end can assign the weight value, determined in the previous step, to each pilot symbol (S172). The multiple weighted pilot symbols are then combined into a single symbol or signal (S173). Lastly, by using the single weighted symbol, demodulation can be performed on each data symbol by using respective information of the weight value corresponding to each pilot symbol (S174).

Joint channel estimation can be performed by using the following algorithm formula.

$$h + \left(\sum_{i=1}^{3} w_i^2 x_i^H x_i\right)^{-1} \left(\sum_{i=1}^{3} w_i^2 x_i^H n_i\right) \quad \text{[Formula 2]}$$

Furthermore, an error estimation ($\epsilon_h = \hat{h} - h$) can be performed by using the following equation.

$$\varepsilon_1 = (x^H x)^{-1} x^H \left(\sum_{i=1}^{3} w_i^2\right) \sum_{i=1}^{3} w_i^2 n_i \quad \text{[Equation 2]}$$

As discussed, the channel estimation is discussed with the principles of a diversity combining technique, such as a RAKE combiner, for optimally combining different propagation paths in a wireless channel at the receiving end so that the multipath effects can be compensated, in turn improving the performance of the receiving end. In other words, consecutively received pilot signals are treated as replicas of the desired original pilot signal. These pilot signals are combined into one signal before channel estimation is performed. With this procedure, the channel estimation complexity can be decreased compared with TI's estimation schemes.

Furthermore, different combining criteria may be used to apply different weight for each pilot signal. Compared to other diversity combining techniques, the embodiment(s) as discussed show that it is better to consider both the SNR and timing difference for deciding proper weights. Moreover, it is possible to apply various weight adjusting schemes based on timing difference.

Figure 18:
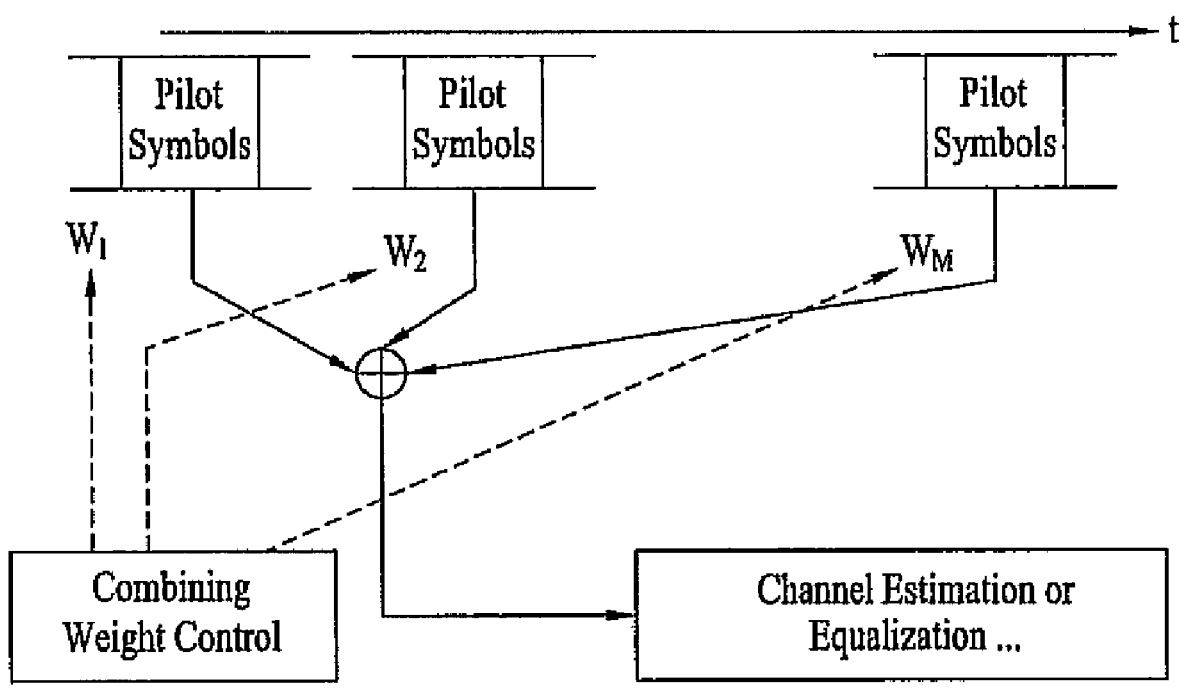
FIG. 18 illustrates an exemplary diagram depicting channel estimation using diversity combining.

FIG. 18 illustrates an exemplary diagram depicting channel estimation using diversity combining. The process related to this figure is discussed with respect to FIGS. 16 and 17.

Diversity combining techniques are traditionally used for combating channel fading. By sending signals that carry the same information through different paths, multiple independently faded replicas of the data symbol can be obtained at the receiver end; hence, more reliable reception is achieved. In EV-DO system, since multiple consecutively received pilot signals may use the channel with a same or similar channel response, they can be combined using different weights in order to obtain the observed data with better SNR for channel estimation. It can result in 3× increase in the received signal power and a better SNR by using three consecutive pilots, $r_1$ $r_2$ and $r_3$, instead of $r_2$ only. Furthermore, compared with joint channel estimation, the computation complexity of channel estimation may be much reduced with diversity combining.

The diversity combining can then be written by the following equation.

$$\begin{aligned}\bar{r}_m &= \sum_{i=1}^{M} w_{mi} r_i \quad \text{[Equation 3]} \\ &= \sum_{i=1}^{M} w_{mi}(x_i h_i + n_i) \\ &= \left(\sum_{i=1}^{M} w_{mi} x_i\right) h_m + \sum_{i=1}^{M} w_{mi} n_i \\ &= \bar{X}_m \hat{h}_m + \bar{N}_m \end{aligned}$$

In Equation 3, $$\bar{X}_m = \sum_{i=1}^{M} w_{mi} x_i \text{ and } \bar{N}_m = \sum_{i=1}^{M} w_{mi} n_i.$$

Here, weights $w_{mi}$, are decided by various criteria for estimating $h_m$. After diversity combining, the LS channel estimation can be done by the following equation.

$$\hat{h}_m = (\overline{X}_m^H \overline{X}_m)^{-1} \overline{X}_m^H \overline{r}_m \quad \text{[Equation 4]}$$

$$= h_m + (\overline{X}_m^H \overline{X}_m)^{-1} \overline{X}_m^H \sum_{i=1}^{M} w_{mi} n_i$$

$$= h_m + (\overline{X}_m^H \overline{X}_m)^{-1} \overline{X}_m^H \overline{N}_m$$

Further, the estimation error can be approximated by Equation 5.

$$\varepsilon_m = \hat{h}_m - h_m \quad \text{[Equation 5]}$$

$$= (\overline{X}_m^H \overline{X}_m)^{-1} \overline{X}_m^H \overline{N}_m$$

Here, if $\overline{N}_m$ is the major error source. After determining the major error source, weights $w_{mi}$ for each received signal $r_i$ can be determined. In the following, various schemes are proposed to calculate the weights for channel estimation.

One of the scheme for calculating the weights for channel estimation relates to optimal channel estimation using MMSE combining (MMSEC). Here, the weights are used to minimize the mean squared errors (MSE) which can be expressed according to Equation 6.

$$\epsilon_m^{MSE} = E\|h_m - (\overline{X}_m^H \overline{X}_m)^{-1} \overline{X}_m^H \overline{r}_m\|_2^2 \quad \text{[Equation 6]}$$

By using Equation 6, $$w_m^{MMSE} = \arg \min_{w_m} \varepsilon_m^{MSE}$$

can be determined. Here, $\overline{X}_m$ is the function of $w_m$. The calculation of the optimal weight vector $w_m^{MMSE}$ involves the estimation of the auto-covariance matrix, $R_{rr} = E\{rr^H\}$, and a cross-covariance matrix $R_{rh_m} = E\{rh_m^H\}$. These can be used to solve the following equation. This equation can be referred to as a Wiener-Hopf equation.

$$\frac{\partial}{\partial w_m} E\left\|h_m - [\overline{W}_m \overline{X}_m (\overline{X}_m^H \overline{X}_m)^{-1}]^H r\right\|_2^2 = 0 \quad \text{[Equation 7]}$$

Here, $\overline{W}_m = w_m \otimes I = \begin{bmatrix} w_{m1} I \\ w_{m2} I \\ \vdots \\ w_{mM} I \end{bmatrix}$.

After the Wiener-Hopf equation is solved, the optimal MMSE solution of $w_m$ can be determined by the following equation.

$$w_m^{MMSE} = \arg \min_{w_m} \|(R_{rr}^+ R_{rh_m} X_m^H - I)(w_m \otimes I)\|_2^2 \quad \text{[Equation 8]}$$

Further, Equation 8 can be calculated using subspace techniques to determined the following.

$$w_m^{MMSE} = \arg \max_{w_m} \|V_n^H (w_m \otimes I)\|_2^{-2} \quad \text{[Equation 9]}$$

Here, $V_n = [v_{QL+1} v_{QL+2} \cdots v_{Q(N-L)}]$ is the signal subspace matrix and $v_i$ is the eigenvector corresponding to the ith largest eigen value of $(R_{rr}^+ R_{rh_m} X_m^H - I)$. $w_m^{MMSE}$ here is the weight vector $w_m$ corresponding to the highest peak of $\|V_n^H (w_m \otimes I)\|_2^{-2}$.

Further to the MMSEC, an equal-gain combining (EGC) scheme can be used for channel estimation. The EGC scheme can be considered as one of the simple diversity combining techniques by setting $w_{mi}^{EG} = 1$. This can be referred to as equal-gain combining and the output of the combiner can be expressed as $$\overline{r}_m = \sum_{i=1}^{M} r_i.$$

At this time, the channel estimation can be expressed as the following.

$$\hat{h}_m = (\overline{X}_m^H \overline{X}_m)^{-1} \overline{X}_m^H \overline{r}_m \quad \text{[Equation 10]}$$

$$= \left(\sum_{i=1}^{M} x_i^H \sum_{i=1}^{M} x_i\right)^{-1} \sum_{i=1}^{M} x_i^H \sum_{i=1}^{M} r_i$$

$$\varepsilon_m = \hat{h}_m - h_m = \left(\sum_{i=1}^{M} x_i^H \sum_{i=1}^{M} x_i\right)^{-1} \sum_{i=1}^{M} x_i^H \sum_{i=1}^{M} n_i \quad \text{[Equation 11]}$$

The EGC is optimal if the channel is assumed to be non-fading and interference-free. Since our ultimate objective is to use diversity combining for mitigate fading effects, the Gaussian channel based EGC can be serves as an interim solution for fading channels.

Further to the MMSEC and the EGC, a maximal ratio combining (MRC) can be used for channel estimation. The MRC can be considered as the optimal form of diversity combining because it yields the maximal SNR achievable providing the back ground noise in different fingers are statistically same. If the background noise and interference are statistically same during the three-pilot period, the weight vector $w_m^{MR}$ in MRC is designed so that the following is true.

$$w_m^{MR} = \arg \max_{w_m} tr\{\overline{r}_m \overline{r}_m^H\} \quad \text{[Equation 12]}$$

$$= \arg \max_{w_m} tr\{(w_m \otimes I)^H rr^H (w_m \otimes I)\}$$

$$= \arg \max_{w_m} \sum_{i=1}^{M} w_{mi}^2 tr\{r_i r_i^H\}$$

$$= \alpha \begin{bmatrix} \|r_1\|_2 e^{-j\theta_1} \\ \|r_2\|_2 e^{-j\theta_2} \\ \vdots \\ \|r_M\| e^{-j\theta_M} \end{bmatrix}$$

Here, where α is a constant factor for adjusting the gain brought by MRC and $e^{j\Theta}$ denote the initial phase of the ith pilot signal.

In MRC, the phases of three received pilot signals being added together are aligned (made mutually coherent) and their envelopes are weighted in proportion to the square roots of their SNRs. Therefore in channel estimation using MRC, the weight $w_{mi}^{MR}$ for the ith received pilot is decided in proportion to the square roots of its SNR, which means $w_{m1}^{MR} = \alpha \|r_i\|_2 e^{j\Theta}$.

Moreover, the total SNR of the combiner output is equal to the sum of the SNRs in each pilot slot, $$SNR^{MR} = \sum_{i=1}^{M} SNR_i,$$

where $SNR^{MR}$ is the combined SNR and $SNR_i$ is the SNR for the ith pilot slot.

If the noise and interference for each received pilot signal are uncorrelated to each other, it is known that MRC is equivalent to MMSEC. Typically MMSEC yields a higher performance bound to MRC. MRC basically is similar to EGC, except that each diversity channel is multiplied by a gain proportional to $\alpha \|r_i\|_2 e^{-j\Theta}$. Therefore, the performance of EGC behaves in a way that is similar to that of MRC and yields a lower bound.

Further, weight adjustment for timing difference will be discussed.

Referring to the principles of diversity combining, it shows that not all received signal vectors play equal roles in channel estimation. Typically the received pilot signals with higher SNR are more important. Here the timing difference between each received pilot signal and the desired time instance can be counted towards deciding its weight besides the SNR. For example, the channel response $h_m$ at the time $t=t_m$ is to be estimated, it is possible that the individual channel estimate $\bar{h}_m$ itself from $r_m$ received at $t=t_m$ is more accurate than the estimates from other received pilot signals $r_{i \ne m}$. Therefore, $r_m$ or $\bar{h}_m$ may be given higher weight than others even if all received signals come with the same SNR. In the following, weight adjusting schemes for adjusting the weights decided from diversity combining techniques are discussed.

First, a weight adjustment using forgetting factor follows the idea in recursive least squares estimation scheme in which weight $w_{mi}$ for a received pilot signal $r_i$ may be adjusted to the new weight. The new weight can be represent according to Equation 13.

$$\tilde{w}_{mi} = \lambda^{|t_i - t_m|} w_{mi} \qquad [\text{Equation 13}]$$

Here, where $w_{mi}$ is the weight decided by previously discussed diversity techniques, $t_m$ is the timing stance of the desired channel response $h_m$, $\lambda \in (0\ 1]$ is called forgetting factor, which is mainly decided by channel coherent time. When $\lambda=1$, there is no change on each weight and $\bar{w}_{mi} = w_{mi}$. When $$\lambda = \frac{1}{2},$$

the adjusted weight vector $\tilde{w}_2$ is $$\tilde{w}_2 = \left[ \frac{1}{2} w_{21} \quad w_{22} \quad \frac{1}{2} w_{23} \right]$$

for the M=3. Hence, the larger the timing different $\Delta_{mi} = |t_i - t_m|$ is, the smaller the adjusted weight $\bar{w}_{mi}$ can be.

Second, weight adjustment for Doppler effects supposes that the mobile is moving to some direction with a constant velocity v during the time between $t_m$ and $t_1$. Here, the normalized auto-correlation due to Doppler effects can be represented as following.

$$R(\Delta_{mi}) = J_0(2\pi f_D \Delta_{mi}) \qquad [\text{Equation 14}]$$

$$= \sum_{n=0}^{+\infty} (-1)^n \left( \frac{\pi f_D |t_i - t_m|}{n!} \right)^{2n}$$

Here, where $f_D = v/\lambda$ refers to the maximum Doppler shift and $J_0(*)$ is the zero-order Bessel function of first kind. If we need consider compensating Doppler effects, the previously decided weight $\bar{w}_i$ need be further adjusted using the following equation.

$$\tilde{w}'_{mi} = J_0(2\pi f_D \Delta_{mi}) \tilde{w}_{mi} \qquad [\text{Equation 15}]$$

$$= J_0(2\pi f_D |t_i - t_m|) \lambda^{|t_i - t_m|} w_{mi}$$

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of detecting at least one channel for channel estimation in a wireless communication system, the method comprising:
   receiving a plurality of signals from a transmitting end, wherein the plurality of signals comprise a plurality of pilot symbols and a plurality of data symbols;
   determining a weight value of each of the plurality of pilot symbols to provide a plurality of weight values, wherein each of the plurality of weight values is determined based on specific information comprising at least a time difference, a direction of one of the plurality of signals, a speed of communicating entities, or a Doppler effect;
   assigning each of the plurality of weight values to a corresponding one of the plurality of pilot symbols; and
   demodulating each of the plurality of data symbols by using the information of the weight value of the corresponding pilot symbol.

2. The method of claim 1, wherein the specific information further comprises at least one of a power of one of the plurality of pilot symbols, a quality of one of the plurality of pilot symbols, a channel condition, and data of interest.

3. The method of claim 1, wherein the wireless communication system implements Orthogonal Frequency Division Multiplexing (OFDM), Code-Division Multiplexing (CDM), Code-Division Multiple Access (CDMA), Multi-Carrier Code Division Multiplexing (MC-CDM) or Multi-Carrier Code-Division Multiple Access (MC-CDMA).

4. The method of claim 1, wherein a first weight value of the plurality of weight values is assigned to a first pilot symbol of the plurality of pilot symbols, and a second weight value of the plurality of weight values is assigned to a second pilot symbol of the plurality of pilot symbols, and wherein the first weight value is greater than the second weight value when a power of the first pilot symbol is stronger than a power of the second pilot symbol.

5. The method of claim 1, wherein a first weight value of the plurality of weight values is assigned to a first pilot symbol of the plurality of pilot symbols, and a second weight value of the plurality of weight values is assigned to a second pilot symbol of the plurality of pilot symbols, and wherein the first weight value is greater than the second weight value when the first pilot symbol is relatively closer to a specified time instance at which a channel response is desired than is the second pilot symbol.

6. The method of claim 1, wherein a first weight value of the plurality of weight values is determined for a first pilot symbol of the plurality of pilot symbols, and a second weight value of the plurality of weight values is determined for a second pilot symbol of the plurality of pilot symbols, and wherein the first weight value is less than the second weight value when a first signal of the plurality of signals comprising the first pilot symbol is from a first communicating entity having a higher speed relative to a second communicating entity providing a second signal of the plurality of signals comprising the second pilot symbol.

7. The method of claim 1, wherein a first weight value of the plurality of weight values is determined for a first pilot symbol of the plurality of pilot symbols, and a second weight value of the plurality of weight values is determined for a second pilot symbol of the plurality of pilot symbols, and wherein the first weight value is less than the second weight value when a first signal of the plurality of signals comprising the first pilot symbol has a first incident angle that is less than a second incident angle of a second signal of the plurality of signals comprising the second pilot symbol, wherein the first and second incident angles are determined with respect to a communication line between a transmitting entity and a receiving entity.

8. A method of detecting at least one channel in a wireless communication system, the method comprising:

receiving a plurality of signals from a transmitting end, wherein the plurality of signals comprise a plurality of pilot symbols and a plurality of data symbols;

determining a weight value of each of the plurality of pilot symbols to provide a plurality of weight values;

assigning each of the plurality of weight values to a corresponding one of the plurality of pilot symbols to provide a plurality of weighted pilot symbols;

combining at least two of the plurality of weighted pilot symbols into a single weighted pilot symbol, wherein the at least two of the plurality of weighted pilot symbols are determined from consecutive pilot symbols; and demodulating each of the plurality of data symbols symbol by using information of the single weighted pilot symbol.

9. The method of claim 8, wherein each of the plurality of weight values is determined based on specific information.

10. The method of claim 9, wherein the specific information comprises at least one of a power of one of the plurality of pilot symbols, a quality of one of the plurality of pilot symbols, a channel condition, data of interest, a time difference, a direction of one of the plurality of signals, a speed of communicating entities, and a Doppler effect.

11. The method of claim 8, wherein the wireless communication system implements Orthogonal Frequency Division Multiplexing (OFDM), Code-Division Multiplexing (CDM), Code-Division Multiple Access (CDMA), Multi-Carrier Code Division Multiplexing (MC-CDM) or Multi-Carrier Code-Division Multiple Access (MC-CDMA).

12. The method of claim 8, wherein a first weight value of the plurality of weight values is assigned to a first pilot symbol of the plurality of pilot symbols, and a second weight value of the plurality of weight values is assigned to a second pilot symbol of the plurality of pilot symbols, and wherein the first weight value is greater than the second weight value when a power of the first pilot symbol is stronger than a power of the second pilot symbol.

13. The method of claim 8, wherein a first weight value of the plurality of weight values is assigned to a first pilot symbol of the plurality of pilot symbols, and a second weight value of the plurality of weight values is assigned to a second pilot symbol of the plurality of pilot symbols, and wherein the first weight value is greater than the second weight value when the first pilot symbol is relatively closer to a specified time instance at which a channel response is desired than is the second pilot symbol.

14. The method of claim 8, wherein a first weight value of the plurality of weight values is determined for a first pilot symbol of the plurality of pilot symbols, and a second weight value of the plurality of weight values is determined for a second pilot symbol of the plurality of pilot symbols, and wherein the first weight value is less than the second weight value when a first signal of the plurality of signals comprising the first pilot symbol is from a first communicating entity having a higher speed relative to a second communicating entity providing a second signal of the plurality of signals comprising the second pilot symbol.

15. The method of claim 8, wherein a first weight value of the plurality of weight values is determined for a first pilot symbol of the plurality of pilot symbols, and a second weight value of the plurality of weight values is determined for a second pilot symbol of the plurality of pilot symbols, and wherein the first weight value is less than the second weight value when a first signal of the plurality of signals comprising the first pilot symbol has a first incident angle that is less than a second incident angle of a second signal of the plurality of signals comprising the second pilot symbol, wherein the first and second incident angles are determined with respect to a communication line between a transmitting entity and a receiving entity.

* * * * *